United States Patent [19]

Mooney

[11] Patent Number: 5,318,447
[45] Date of Patent: Jun. 7, 1994

[54] MULTIPLICATION SQUARE GAME AND METHOD

[76] Inventor: Margaret E. Mooney, 12901 Northwest 160th Ave., Morriston, Fla. 32668

[21] Appl. No.: 973,179

[22] Filed: Nov. 9, 1992

[51] Int. Cl.$^5$ .............................................. G09B 19/22
[52] U.S. Cl. .................................. 434/128; 434/107; 434/209; 273/256
[58] Field of Search ............... 434/188, 191, 209, 107, 434/128, 129; 273/272, 256, 249, 248, 242, 236

[56] References Cited

U.S. PATENT DOCUMENTS

| | | | |
|---|---|---|---|
| 1,319,561 | 10/1919 | Brenner | 273/272 |
| 2,205,440 | 6/1940 | Schoenberg et al. | 273/299 |
| 3,104,106 | 9/1963 | Kenney et al. | 434/191 X |
| 5,033,754 | 7/1991 | Finch | 273/299 |

OTHER PUBLICATIONS

Nabisco, "Fruit Wheats Breakfast Cereal" Box, Received by PTO Nov. 21, 1988.

Primary Examiner—Gene Mancene
Assistant Examiner—Jeffrey A. Smith
Attorney, Agent, or Firm—Robert J. Van Der Wall

[57] ABSTRACT

An educational game for teaching arithmetic includes a game board having a travel route divided into segments, at least one arithmetic problem printed within each of at least some of the segments, several individual game tokens, each token for marking a player's location along the travel route, a chance control device for determining the extent of a single movement of each token, and an answer card providing the solution to the at least one arithmetic problem, and is offered at several levels of difficulty. A method of playing this educational game is provided, where several players take turns, one turn including the steps of a player activating the chance control device and advancing a token along the travel path a number of segments as indicated by the chance control device, offering a solution to any arithmetic problem contained within the segment on which the token comes to rest after being so advanced, comparing the solution to the correct solution appearing on the answer card, keeping the token on the segment if the offered solution matches the solution appearing on the answer card, and moving the token backward at least one segment along the travel route if the offered solution fails to match the solution appearing on the answer card.

13 Claims, 3 Drawing Sheets

BASIC TIMES TABLE

| | | | | | | | |
|---|---|---|---|---|---|---|---|
| 2x2= 4 | 3x3= 9 | 4x4=16 | 5x5=25 | 6x6=36 | 7x7=49 | 8x8=64 | 9x9=81 |
| 2x3= 6 | 3x4=12 | 4x5=20 | 5x6=30 | 6x7=42 | 7x8=56 | 8x9=72 | |
| 2x4= 8 | 3x5=15 | 4x6=24 | 5x7=35 | 6x8=48 | 7x9=63 | | |
| 2x5=10 | 3x6=18 | 4x7=28 | 5x8=40 | 6x9=54 | | | |
| 2x6=12 | 3x7=21 | 4x8=32 | 5x9=45 | | | | |
| 2x7=14 | 3x8=24 | 4x9=36 | | | | | |
| 2x8=16 | 3x9=27 | | | | | | |
| 2x9=18 | | | | | | | |

MULTIPLICATION SQUARE GAME AND METHOD

BACKGROUND OF THE INVENTION

1. Field of the Invention:

The present invention relates generally to the field of educational games, and more specifically to a game for teaching arithmetic. It includes tokens and a game board having a counterclockwise directed, marginal travel route around four playing sides. The travel route is divided into a series of rectangular spaces serving as stopping points for the tokens, including a beginning space. The game also includes a die, an arithmetic problem, preferably one of multiplication and printed horizontally within each of the majority of spaces with the smaller factor number appearing first, answer cards, and scattered spaces containing instructions rather than a problem, play money and investment cards. Also included is a method of playing the game including the steps of rolling the die, advancing a token along the travel path the number of spaces indicated on the die, offering a solution to any arithmetic problem contained within the space at which the token comes to rest, comparing the offered solution to the correct solution appearing on an answer card, keeping the token on the space if the offered solution matches the answer card solution, and returning to the beginning space if the offered solution does not match the answer card solution. The winner of the game is determined either by which player first completely travels the route around the board or by which player has the most money at that moment. The game is offered at several levels of difficulty.

2. Description of the Prior Art:

There have long been games for entertainment and instruction. Contemporary educational games have origins in various skill and chance games played over the centuries in diverse regions of the world. Games involving chance include card games, which probably originated in Hindustan about A.D. 800, and made their way to Italy by 1279. From Italy these card games spread to Germany, then to France and Spain.

The best known game of skill is probably chess. Some scholars believe chess was invented in India thousands of years ago and later introduced to Persia. The term chess in fact comes from an ancient Persian word for king. The game later appeared in China, and in the A.D. 600's was brought to Europe by the Arabs. The playing pieces were given their present form during the fifteenth century.

Various board games have also evolved in which each player is represented by a single game piece or token, and the pieces race each other across the board to a predetermined destination. According to *Board & Table Games*, by R. C. Bell, 1969, a great many spiral race board games were invented between 1750 and 1850, some for entertainment only, and others for teaching history, geography and scripture. An example of a spiral race board game is that of Jubilee, which dates from at least 1810. Twelve sections of paper are pasted onto a linen backing, forming a counterclockwise spiral of pictures, numbered from 1 to 150. Six players each have a colored marker which they advance an extent indicated by spinning a teetotum. The players pay fines and receive rewards as they progress through the game. The first player scoring exactly 150, referred to as Jubilee, wins the game. By 1850 an oval race game, appropriately called the Game of the Race, appeared. Players were each provided with a playing piece in the shape of a horse and jockey. Movement across the board was controlled by rolls of a six-sided die. Modern board and race games have been developed to teach academic subjects, examples of which are found in various issued patents.

Kenney, U.S. Pat. No. 3,104,106, issued on Sep. 17, 1963, discloses an educational board game having a travel path divided into stopping spaces. The travel path includes a main outer circuit and a branch path diverging inwardly therefrom for each player. Each player must travel around the outer circuit first, and then travel to the end of his branch path. Most of the stopping spaces are marked with geometric designs indicating a particular type of arithmetic problem to be solved. Other scattered spaces may contain directions. The player receives fractional disc parts from a game bank to manipulate to solve problems. To play the game, a player rolls a pair of dice and advances the number of spaces shown. Then the player draws a problem card matching the geometric design in the space on which he stops, the card having a problem to be solved on its other side. Each player receives points for correctly solving problems, and the player with the most points at the end of the game wins, the game ending when one player completes the circuit and arrives at the end of his branch path. A problem with Kenney is that it teaches dependency on using the fractional discs to solve problems. Another problem is that Kenney is offered for only one level of difficulty, so that only a narrow range of persons can benefit from it. Finally, only one player sees each problem, and only momentarily while a card is drawn, minimizing exposure and increased familiarity with the subject material.

Schoenberg, U.S. Pat. No. 2,320,832, issued on Jun. 1, 1943, discloses at least two different game boards, one being checkered with a diagonal dividing line. Numerals appear in light squares on either side of the line, and these numerals decrease to zero as they approach the line. Each player receives six tokens called men, and spins a dial which comes to rest indicating a number. The player subtracts the indicated dial number from the number in a square on which any of his men rests, and moves such man to any square which bears a number equal to the remainder. The player may move only parallel to an edge of the board. By thus moving men to lower numbered squares, the men advance toward the line. When all of a player's men are positioned in zero value squares adjacent to the line, the game ends. The score for each player is based on the number and location of each of the player's remaining men. A problem with this game is that it is not always clear who is leading, and this diminishes the excitement of the competition. And, once again, a question is only momentarily viewed. Another version of the game is played with cards and no board, and is supposed to teach the multiplication tables. A second game board is similar in design to that commonly used for SCRABBLE TM, a trademark of the Milton Bradley Company. Blocks with numbers and operation symbols are placed on the SCRABBLE-like board to create interlocking horizontal and vertical equations rather than words. The player receives one point for each correct and complete equation. A problem with this arrangement is that there is no answer key to verify all possible combinations. Another problem is that players lose the excitement of a race around a path in which their relative positions are clearly apparent. Finally, only one level of difficulty is apparently provided.

Denalsky, U.S. Pat. No. 3,831,946, issued on Aug. 27, 1974, teaches an educational board game having a travel path extending from a start box to a finish box. Squares painted colors to contrast with adjacent squares form steps in the path. To play, a die is thrown, the player moves a token the indicated number of spaces, and then draws a card presenting a question and containing a hidden answer. If the player solves the problem correctly he rolls the die again, progressing in this way until a wrong answer is given. When the player gives a wrong answer, the token moves back three spaces and the next player takes a turn. Random free spaces are provided along the path to create rest pauses. The game continues until a player reaches the finish box. A stack of cards is selected having a difficulty level to suit a particular school grade or age group. A problem with Denalsky is that the questions are only momentarily displayed to a single player when a card is drawn, limiting exposure to the subject matter.

Calloway, U.S. Pat. No. 4,714,254, issued on Dec. 22, 1987, teaches a game board containing an outer travel path having player spaces marked with pictorial or printed indicia, an inner travel path made up of spaces indicating subject classes, sets of cards representing tests and lessons, a dial to spin to determine how many spaces along the outer path the player is to advance, and two tokens to move and indicate position. The player spins the dial and moves his first token along the outer path. Some spaces it lands on are instructional, stating that the token is to be moved ahead or back a certain number of spaces, while other spaces will say to take a lesson or a test, and the player draws a card accordingly. If the player misses a question he stays where he is. If he answers all questions on the card correctly, he advances his second token one space along the inner path, indicating mastery of a class. When a player's second token has moved through all inner spaces or classes, he wins and the game is over. Two to eight players can play at once. A problem with Calloway is that, once again, the questions are only momentarily displayed while a card is drawn. Another problem is that the game presents several subject areas at once, which could prove overwhelming and ineffective.

Hausman, U.S. Pat. No. 4,029,320, issued on Jun. 14, 1977, discloses an educational game intended for teaching many different subjects. A game board is provided having its surface divided into one hundred rectangular spaces called stations, and a central area for groups of cards. A player rolls dice and advances a token the number of spaces shown on the dice clockwise on the board, and draws a card corresponding to the type of station on which it lands. Some spaces contain instructions instead, such as to advance or fall back several spaces. Some of the cards contain teaching materials, such as an arithmetic problem, and show the solution on the back of the card. A correct answer is required for advancement. Any number of persons can play. The problems presented by Hausman are the same as those identified for Calloway.

Bearing in mind the foregoing, it is a principal object of the present invention to provide an educational game which places numerous arithmetic problems in the constant view of the players to maximize their exposure to and familiarity with arithmetic expressions.

Another object of the present invention is to provide such a game which offers multiple levels of playing difficulty.

A further object of the present invention is to provide such a game for teaching a simplified way of solving a multiplication problem from memory by placing the smaller factor first.

An additional object of the present invention is to provide such a game offering the competition of a race along a path which, at a beginning level, makes readily apparent at any given moment which player leads and by how much.

One more object of the present invention is to provide such a game which is easy to understand and inexpensive to manufacture.

SUMMARY OF THE INVENTION

The present invention accomplishes the above-stated objectives, as well as others, as may be determined by a fair reading and interpretation of the entire specification.

An educational game is provided for teaching arithmetic, including a game board having a travel route divided into segments, at least one arithmetic problem printed within each of at least some of the segments, several individual game tokens, each token for marking a player's location along the travel route, a chance control device for determining the extent of a single movement of each token, and an answer card providing the solution to the at least one arithmetic problem. The game optionally includes play money for each player to receive for correctly solving at least one arithmetic problem, in an amount corresponding in magnitude to the solution of the arithmetic problem. Also preferably included are investment cards for a player to draw as an alternative to moving a game token, on which the player invests a certain amount of the play money and receives a return in a random chance percentage amount of the certain amount invested, which is printed on the particular card thus drawn. At least one of the segments preferably contains instructions rather than an arithmetic problem. A timer is also preferably provided for measuring a time limit during which a player must solve the arithmetic problem contained within one of the segments, the problem preferably being a multiplication problem. Such a multiplication problem is preferably printed horizontally, with a factor being followed by the multiplication sign, followed by a second factor, the smaller of the factors being located to the left of the multiplication sign. The chance control device may be a die. The game board has a perimeter and the travel route preferably extends along the perimeter, each segment preferably being a rectangle.

A method of playing this educational game is also provided, where several players take turns, one turn including the steps of one player activating the chance control device and advancing one token along the travel path a number of segments as indicated by the chance control device, offering a solution to any arithmetic problem contained within the segment on which the token comes to rest after being so advanced, comparing the solution to the correct solution appearing on the answer card, keeping the token on the segment if the offered solution matches the solution appearing on the answer card, and moving the token backward at least one segment along the travel route if the offered solution fails to match the solution appearing on the answer card. Where the game is at a difficulty level including a bank containing play money, the method additionally includes the step of collecting some of the play money from the bank upon offering a solution to the problem which matches the solution appearing on the answer card. Another limitation on the problem solving step is offering the solution within a preset time limit measured by a timer. An optional step is that of paying a fine of some of the play money for failing to speak courteously when receiving play money from the bank.

BRIEF DESCRIPTION OF THE DRAWINGS

Various other objects, advantages, and features of the invention will become apparent to those skilled in the art from the following discussion taken in conjunction with the following drawings, in which:

FIG. 2 is a front view of an answer card.

FIG. 3 is a front view of twenty-eight adjacent investment cards displaying various investment messages.

DETAILED DESCRIPTION OF THE PREFERRED EMBODIMENTS

Figure 1:
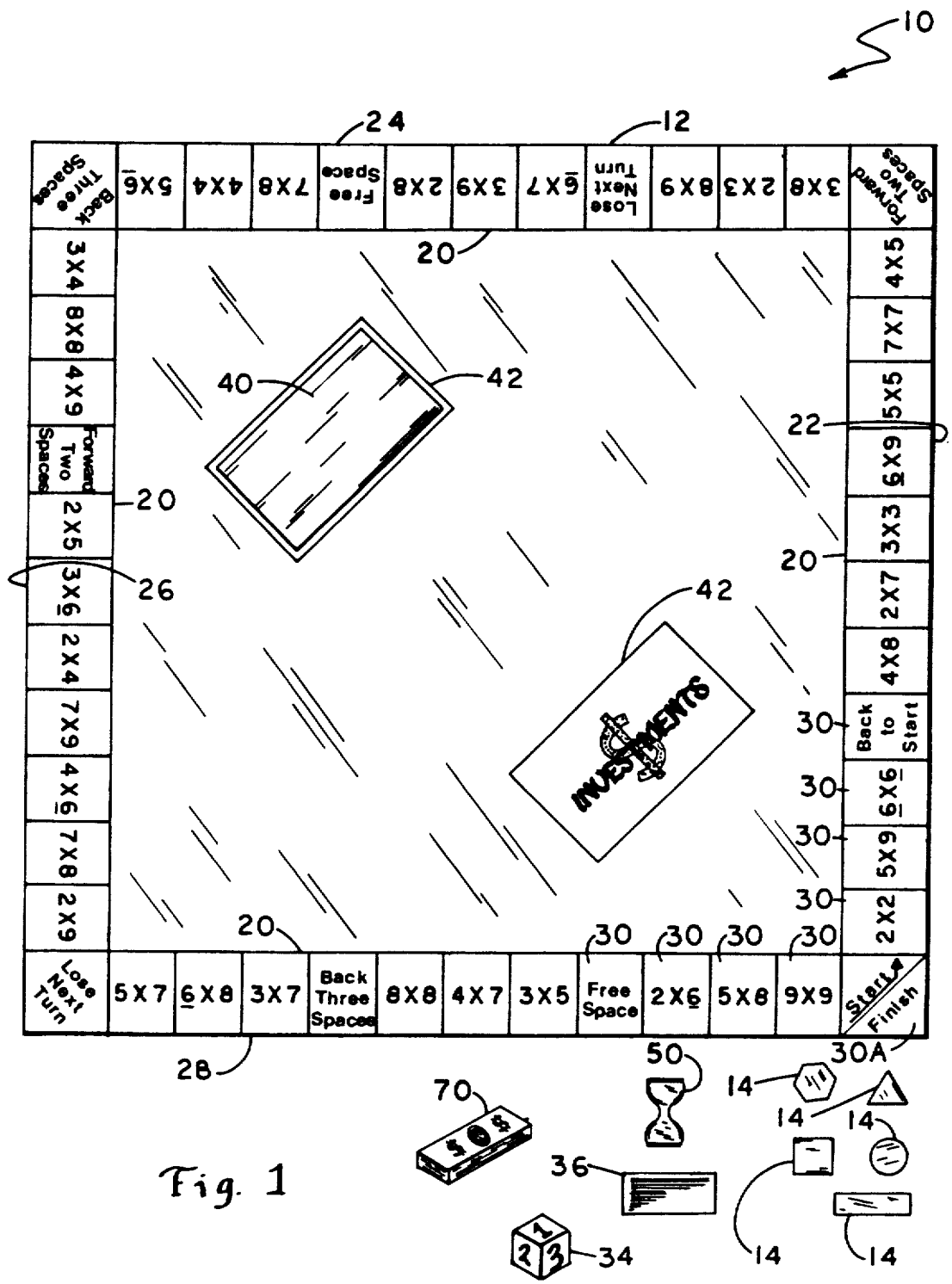
FIG. 1 is a top view of the preferred embodiment of the inventive game board, also illustrating five paying tokens, the sand timer, the die, the play money, an answer card, and the investment cards in the upper marked space on the board.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIG. 1, an educational game 10 for teaching multiplication tables is disclosed, including a game board 12 and five playing tokens 14. Game board 12 has a flat playing surface provided with a preferably counterclockwise directed, marginal travel route 20 extending along four playing sides 22, 24, 26 and 28. Travel route 20 is divided into a series of rectangular spaces 30 which serve as stopping points for tokens 14 during the playing of game 10. The beginning space 30a in the series is labeled "start/finish". Players advance from space 30a around travel route 20 by taking turns rolling a die 34 and each moving their individual tokens 14 the number of spaces 30 corresponding to the number on the upward-directed face of die 34.

An arithmetic problem, preferably one of multiplication, is printed horizontally within most spaces 30 with the smaller factor number appearing first, to illustrate the simplified approach of always writing elements of a multiplication problem in this order. Placing the smaller factor first permits the player to solve all problems by memorizing only combinations written in this order. See FIG. 2. A player is permitted to remain in a space 30 only if they correctly solve the problem appearing in the space. An incorrect solution takes the player back to space 30a. Several spaces 30 contain instructions rather than a problem, such as "back to start", "forward two spaces", "lose a turn", "back three spaces", and so on as seen in FIG. 1. Should the player arrive at one of these latter types of spaces 30, the instructions are followed. If the player is instructed to move forward or back a certain number of spaces 30, the player is required to solve the problem appearing in that space 30. The answer given by the player is checked against the solution provided on an answer card 36. See FIG. 2. Five identical answer cards 36 are preferably provided so that each player as well as a banker, if any, can observe the correct solution.

The game 10 trademark 38 is preferably printed diagonally across the center of board 12. Location markings 42 for investment cards 40 are preferably provided both above and below trademark 38 onto which cards 40 are placed face down. The marking 42 above trademark 38 is for unused cards 40 and the marking 42 below is for cards 40 which have been drawn. It is also preferred that the player be granted only a limited time period, such as thirty seconds, in which to complete their turn. To measure these time periods, a sand timer 50 of any suitable type available on the market is provided.

The winner of game 10 is determined by various means, depending on the level of play selected. As described in detail below, the winner may be the player first completing a circuit around route 20 and again reaching space 30a. Alternatively, the winner may be the player having the most money, according to the rules of the particular game 10 level selected, at the moment when any player completes the circuit.

Method

In practicing the invention, the following methods may be used.

I. Level One

Level one is intended for beginners at playing game 10, or for the youngest or otherwise least skilled players. The rules for level one are therefore simple. The players begin by rolling die 34 to determine the order of their turns. Then each player in turn rolls die 34 and advances the number of spaces 30 indicated on die 34. If the token 14 lands on an instruction space 30, the player follows the instructions. If the token 14 lands on a multiplication problem space 30, the player attempts to solve the problem. A correct answer permits the player to keep his token 14 at that space 30, and the next player takes a turn. A wrong answer takes the player back to beginning space 30a, and again, the next player takes a turn. The first player to complete the circuit around route 20 and reach "start/finish" space 30a wins.

II. Level Two

Level two is more complex than level one and is intended for an advanced player. To begin level two, the players appoint a banker who distributes and counts play money 70 and operates timer 50. The banker is preferably not a player. Level two is like level one except that a player correctly solving a problem in a space 30 receives an amount of play money 70 corresponding to the magnitude of the solution. If the player gives a wrong answer, they return to space 30a, as in level one, but they also pay the bank a fine, such as $10.00. If a token lands on an instruction space 30 labeled "free space", no money is collected and the token remains on that space. When a player completes the circuit around travel route 20 and reaches "start/finish" space 30a, the game ends. Each player counts their play 70, preferably by separating it by denomination into piles of $100.00, beginning with the largest denomination. Then the banker verifies the count and declares the player having the most play money 70 to be the winner. The purpose of the inclusion of play money 70 is to teach the players the practical skills of counting and handling money. Manners are optionally required, and a small fine may be charged if a player fails to say "please" or "thank you" when paying or receiving play money 70.

III. Level Three

Figure 3:
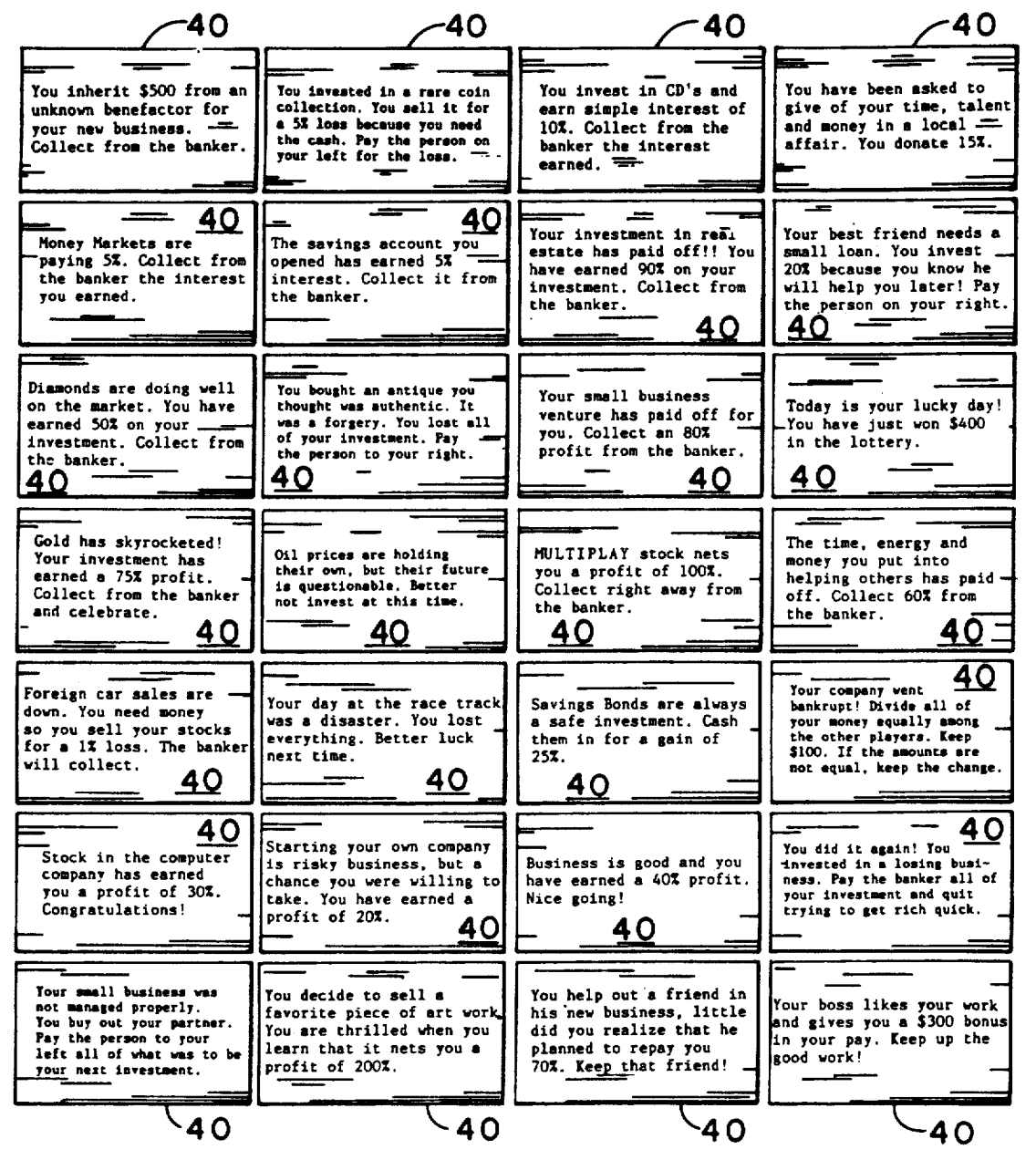

Level three is more complex than level two and is intended for the most advanced player. The rules of play for level three are the same as those for level two, except as follows. For each player's turn, die 34 is rolled or the player alternatively draws an investment card 40 and invests some play money 70 in fixed increments of $100.00, according to instructions on the card 40. See FIG. 3. Increments of $100.00 are preferred because it is easier to understand percentage earnings based on that amount, and these percentages are also given on cards 40. The banker handles the investment transaction and pays the player immediately, unless the card 40 indicates otherwise. The investment may return more money or less money than the amount invested, and thus introduces a further element of chance into game 10. The purpose of the investment option is to teach the players how investments work on an elementary level.

It is to be understood that game 10 may comprise more or less than three playing levels, and arithmetic problems other than multiplication may be provided. Also, several equivalent paths for travel route 20 are contemplated. It is also contemplated that game 10 may be programmed into a computer and the appended claims are understood to cover this equivalent embodiment.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An educational game for teaching arithmetic, comprising:
    a game board having a travel route divided into segments;
    at least one arithmetic problem printed within each of at least one of said segments;
    a plurality of individual game tokens, each of said tokens for marking a player's location along said travel route;
    chance control means for determining the extent of a movement of each said token;
    an answer card providing the solution to said at least one arithmetic problem;
    play money for each player to receive for correctly solving said at least one arithmetic problem, in an amount corresponding in magnitude to the solution of said at least one arithmetic problem; and
    investment cards having a random chance percentage amount printed thereon, said cards for a player to draw as an alternative to moving a game token, on which said player invests a certain amount of said play money and receives a return in a random chance percentage amount of said certain amount invested.

2. The educational game of claim 1, wherein at least one of said segments contains instructions.

3. The educational game of claim 1 further comprising:
    timer means for measuring a time limit during which a player must solve said at least one arithmetic problem contained within one of said segments.

4. The educational game of claim 1, wherein said at least one arithmetic problem printed within said at least one of said segments is a multiplication problem.

5. The educational game of claim 4, wherein each said multiplication problem is printed linearly, with a factor being followed by the multiplication sign, followed by a second factor.

6. The educational game of claim 5, wherein each said multiplication problem comprises two factors, one factor being numerically smaller than the other, and said smaller factor being located to the left of said multiplication sign.

7. The educational game of claim 1, wherein said chance control means comprises a die.

8. The educational game of claim 1, wherein said game board has a perimeter and said travel route extends along said perimeter.

9. The educational game of claim 1, wherein each of said segments is a rectangle.

10. A method of playing an educational game comprising a game board having a travel route divided into segments; at least one arithmetic problem printed within each of at least one of said segments; a plurality of individual game tokens, each of said tokens for marking a player's location along said travel route; chance control means for determining the extent of a movement of each of said tokens; and an answer card providing the solution to said at least one arithmetic problem, wherein there are a plurality of players taking turns, one said turn comprising the steps of:
    a player activating said chance control means and advancing one of said tokens along said travel path a number of segments indicated by said chance control means;
    offering a solution to any arithmetic problem contained within the segment on which said one of said tokens comes to rest after being so advanced;
    comparing said solution to the correct solution provided by said answer card;
    keeping said one of said tokens on said segment if said offered solution matches the solution provided by said answer card; and
    moving said one of said tokens backward at least one said segment along said travel route if said offered solution fails to match the solution provided by said answer card.

11. The method of claim 10, wherein said game comprises a bank containing play money, and further comprising the step of:
    collecting a quantity of said play money from said bank upon offering a solution to said problem which matches the solution appearing on said answer card.

12. The method of claim 11 further comprising the step of:
    offering said solution within a preset time limit measured by a timer.

13. The method of claim 11 further comprising the step of:
    paying a fine of a quantity of said play money for failing to speak courteously when receiving said play money from said bank.

* * * * *